United States Patent [19]

Czarnecki

[11] 4,303,236
[45] Dec. 1, 1981

[54] TRIP MOTION SIMULATOR

[75] Inventor: Adolph Czarnecki, Birmingham, Mich.

[73] Assignee: Kinop International, Inc., Detroit, Mich.

[21] Appl. No.: 173,021

[22] Filed: Jul. 28, 1980

[51] Int. Cl.³ .......................... G09B 9/02; A47C 1/12
[52] U.S. Cl. .......................................... 272/18; 434/34
[58] Field of Search .................... 272/16, 17, 18, 2; 434/44

[56] References Cited

U.S. PATENT DOCUMENTS

| 508,227 | 11/1893 | Lake | 272/16 |
| 892,070 | 6/1908 | Murphy | 272/17 |
| 1,340,570 | 5/1920 | Smith | 272/17 |
| 1,789,680 | 1/1931 | Gwinnett | 272/18 |
| 1,803,397 | 5/1931 | Rizza | 272/17 X |
| 3,873,085 | 3/1975 | Nakamura | 272/2 |
| 4,066,256 | 1/1978 | Trumbull | 272/18 |

FOREIGN PATENT DOCUMENTS

| 1273969 | 9/1961 | France | 272/18 |
| 425723 | 10/1947 | Italy | 272/18 |

Primary Examiner—George J. Marlo
Attorney, Agent, or Firm—Harness, Dickey & Pierce

[57] ABSTRACT

A motion simulator having a people-holding capsule mounted on a supporting structure comprising pitch and roll cradles which are uniquely nested together and otherwise interrelated to hold the capsule minimumly spaced from the floor or base surface on which the simulator is mounted and having drive mechanisms for rockably actuating the cradles to move the capsule fore-and-aft and/or from side-to-side. A movie screen may be located at the front of the capsule where projected images can be readily viewed by the people inside the capsule.

9 Claims, 13 Drawing Figures

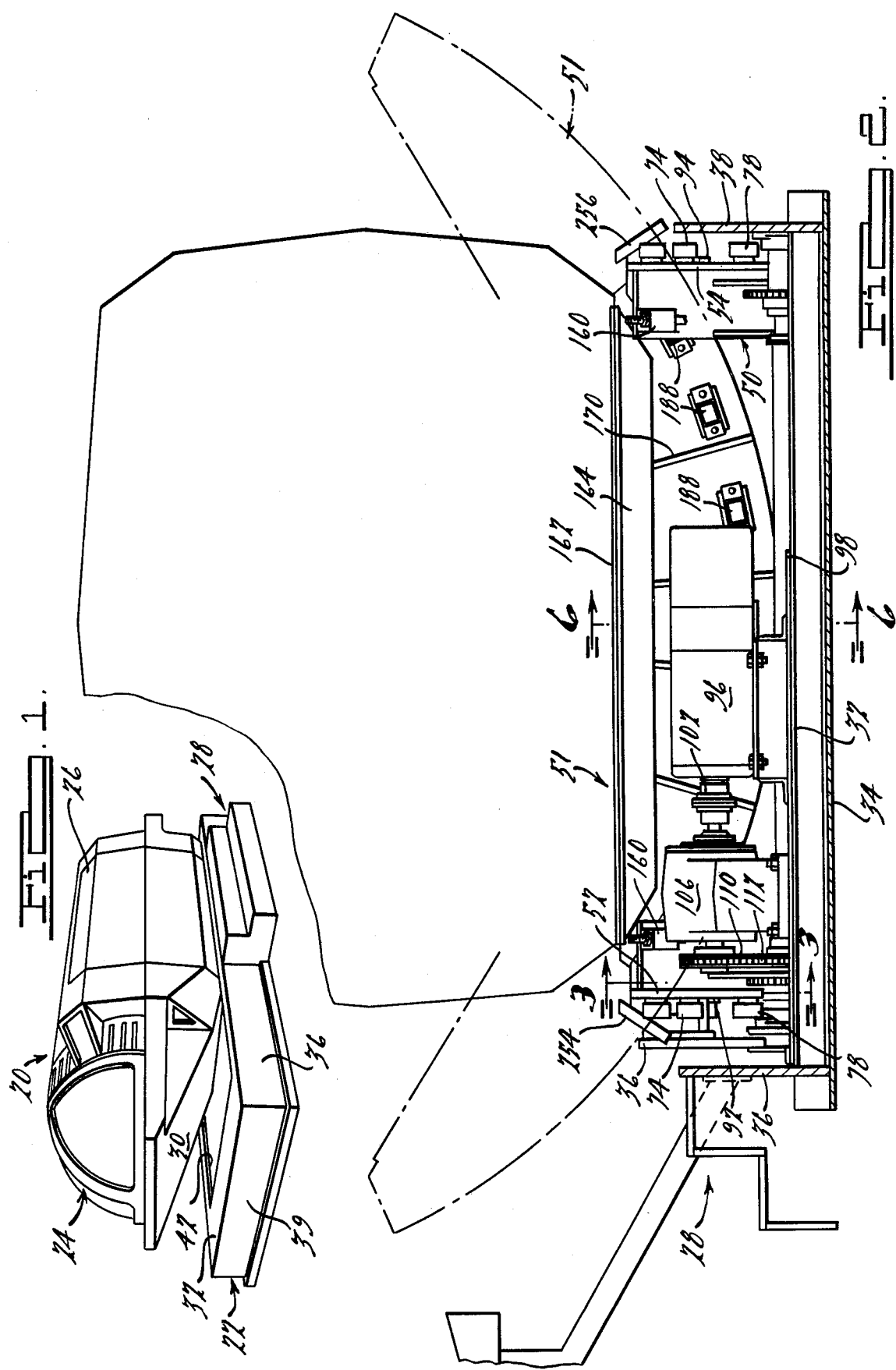

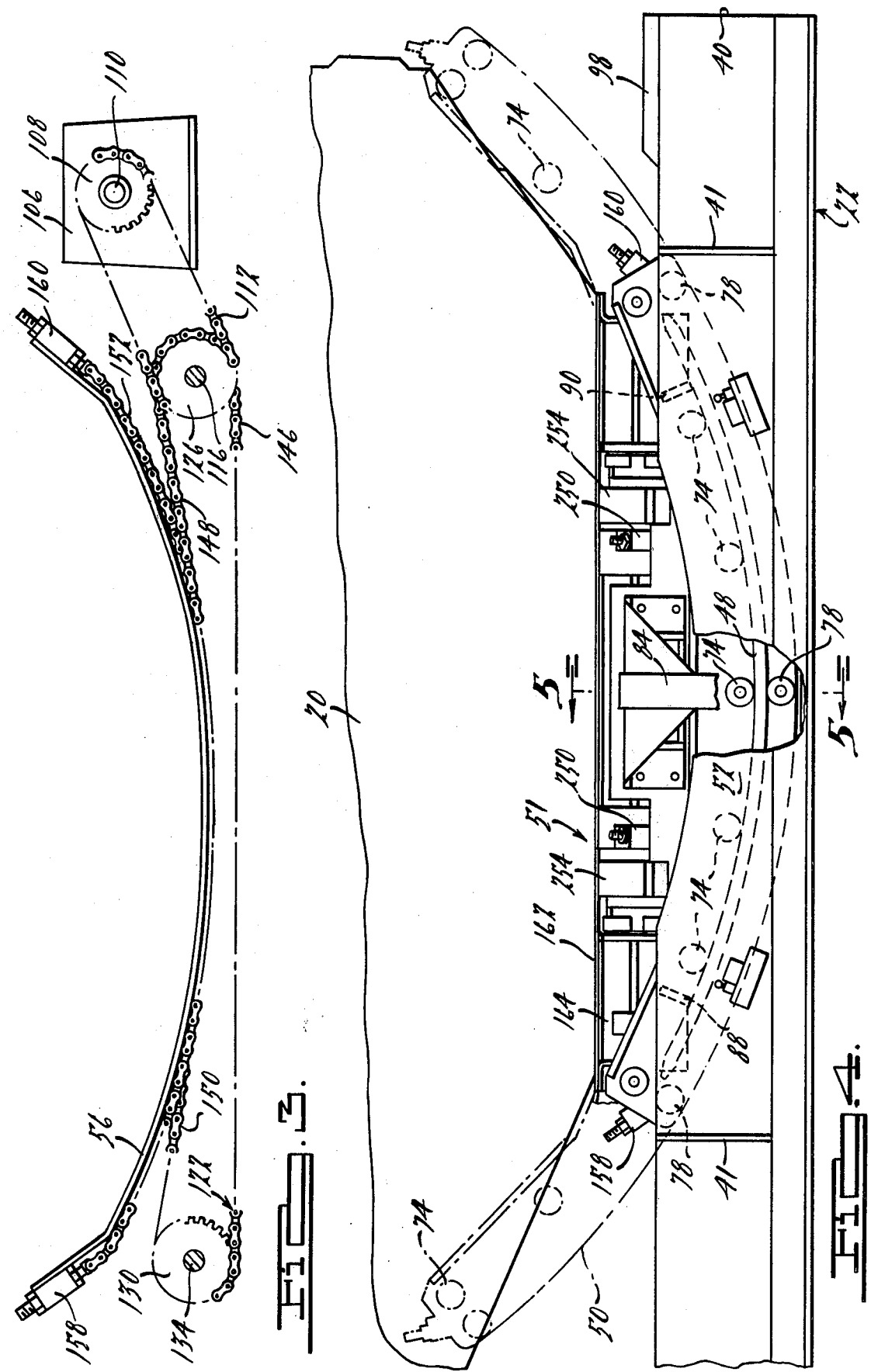

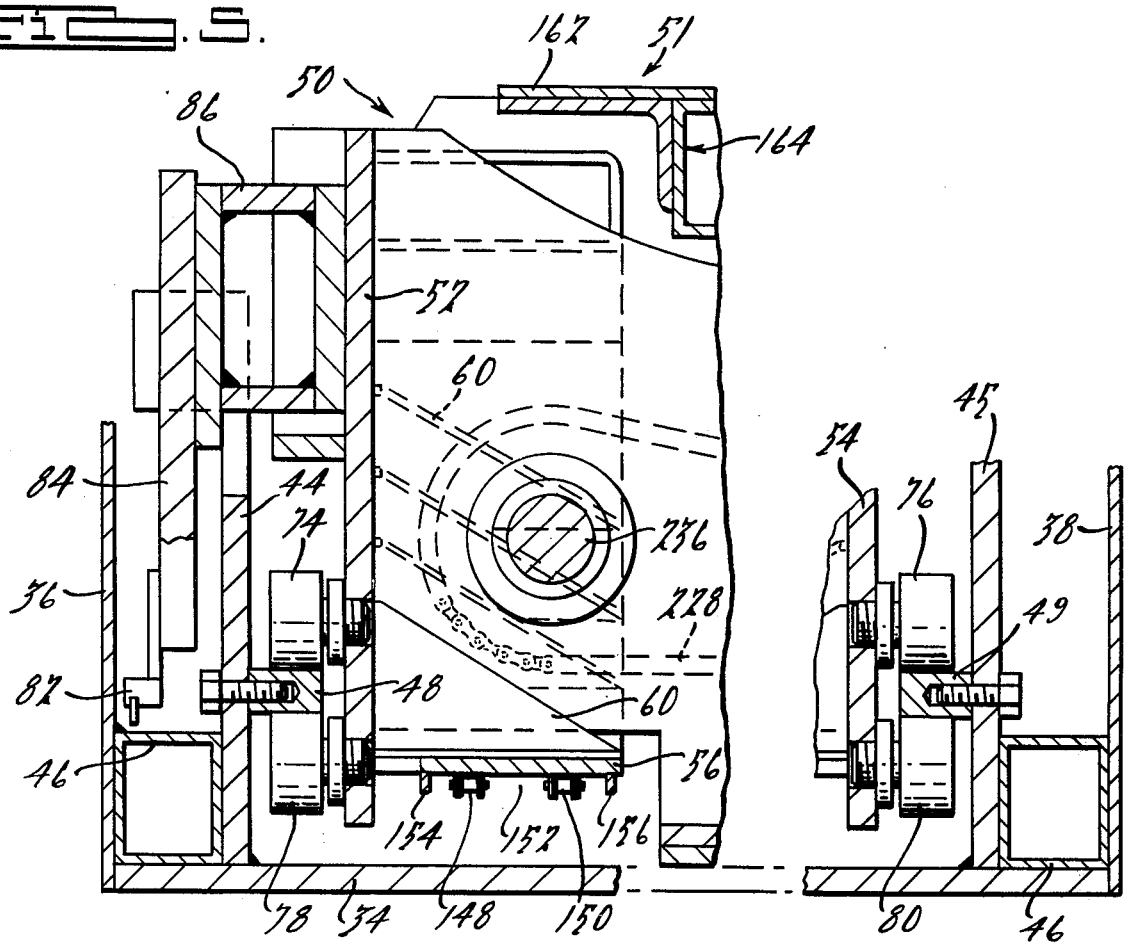
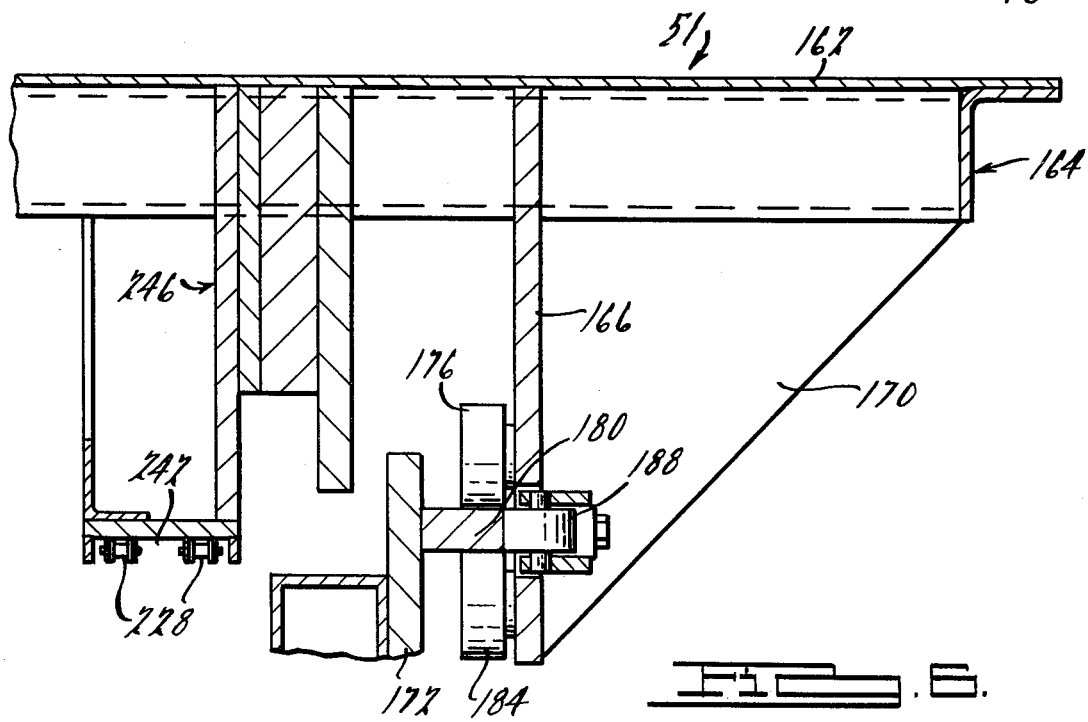

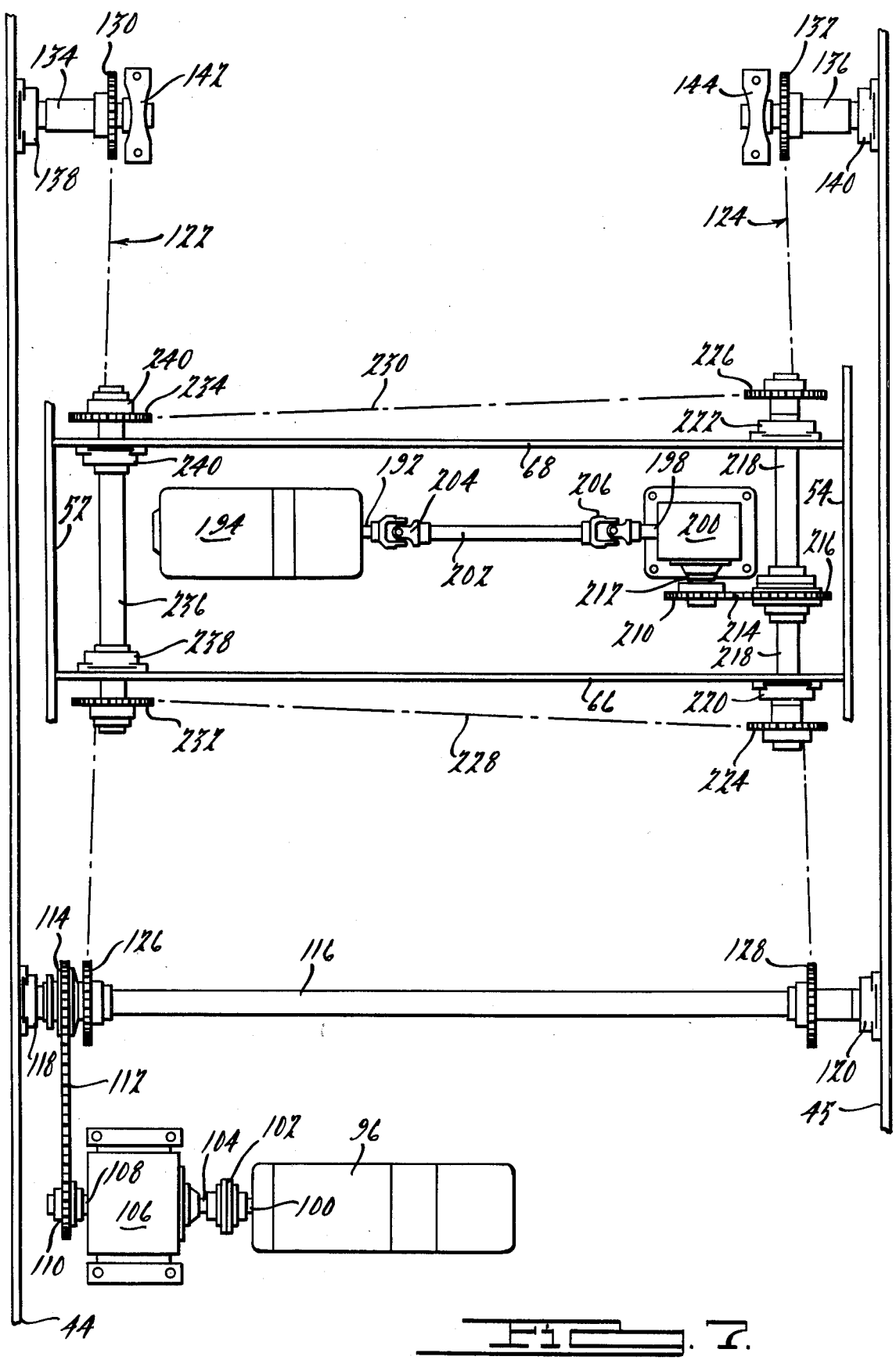

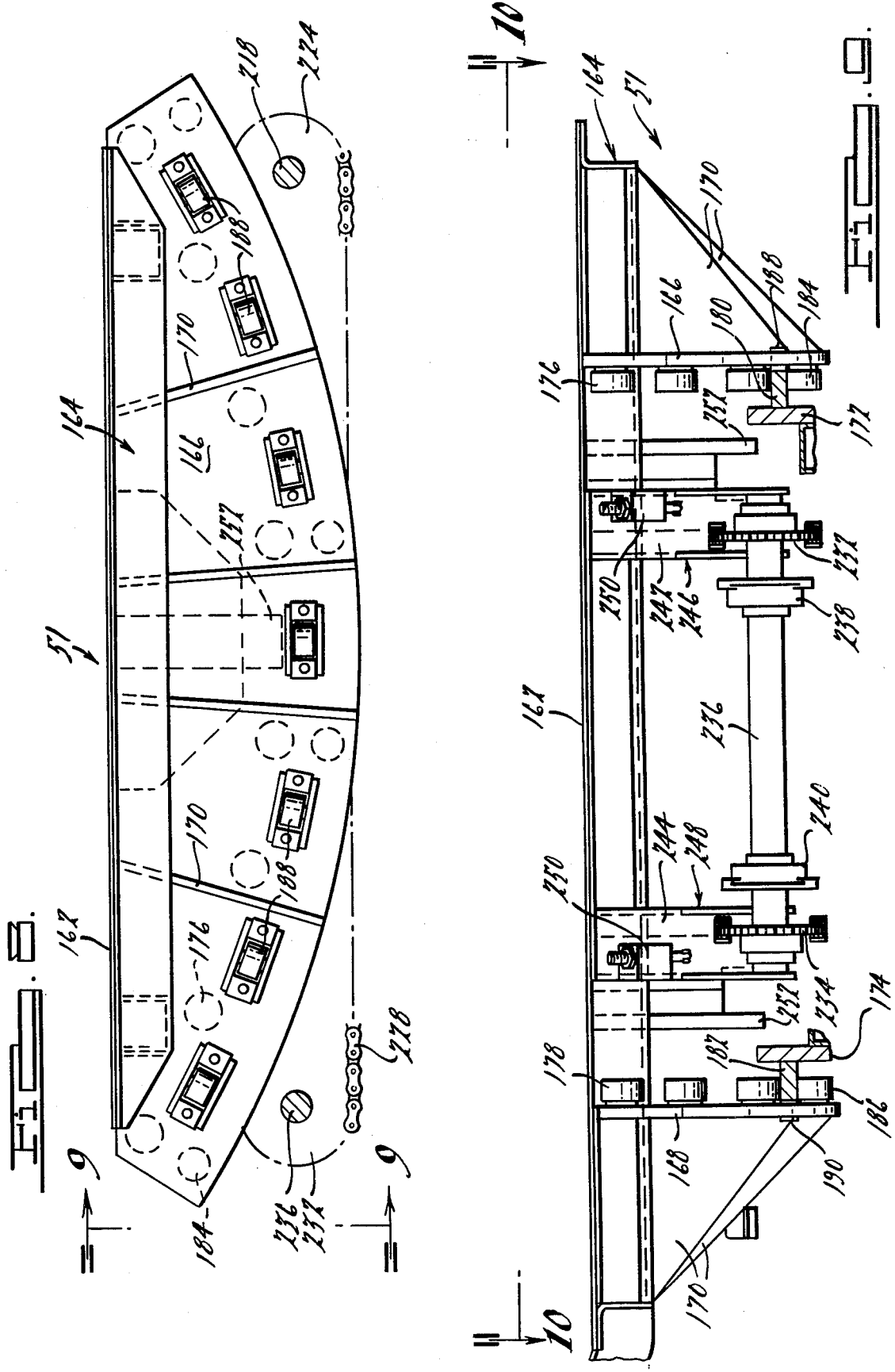

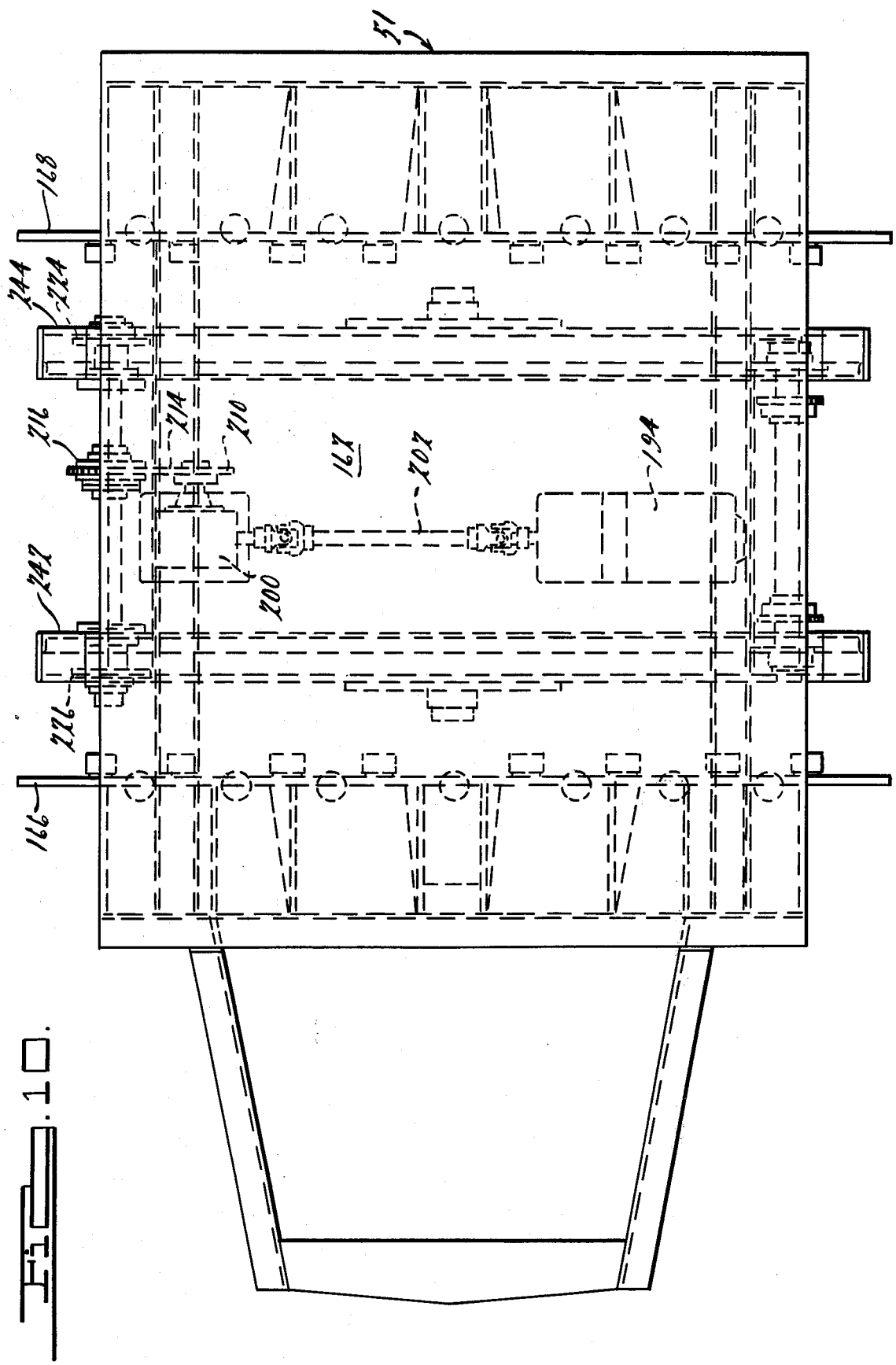

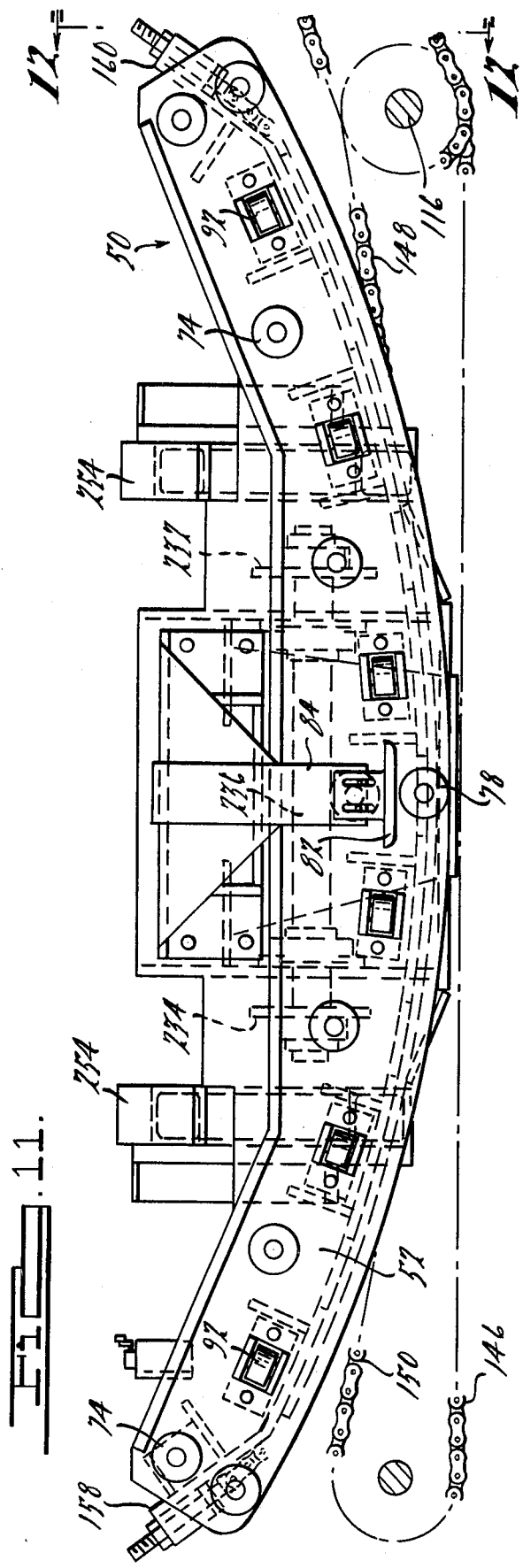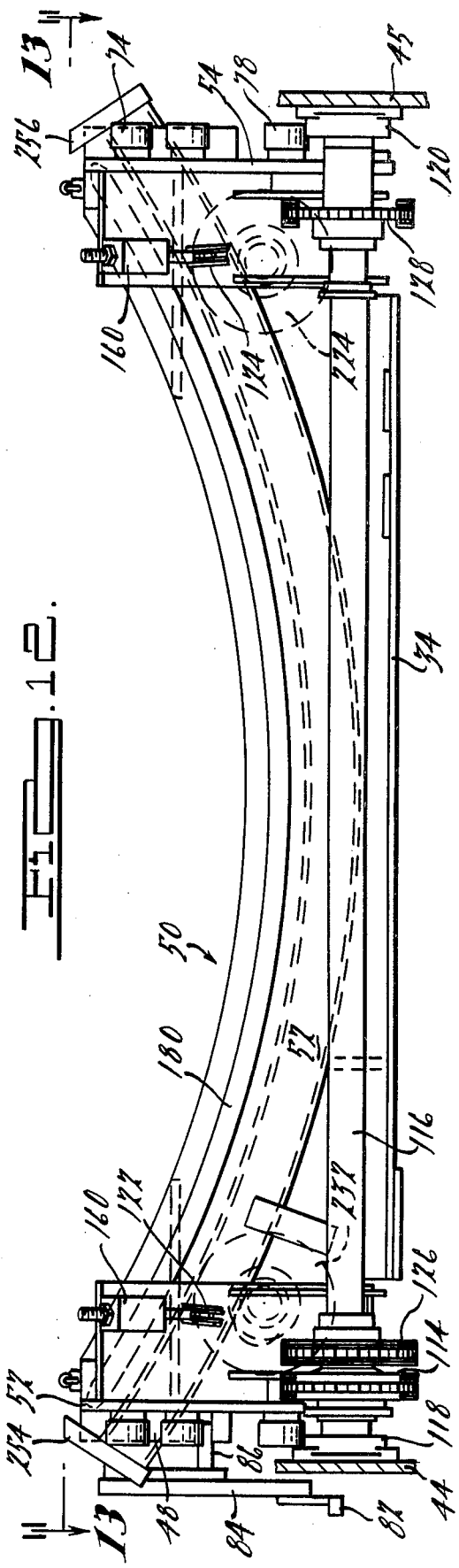

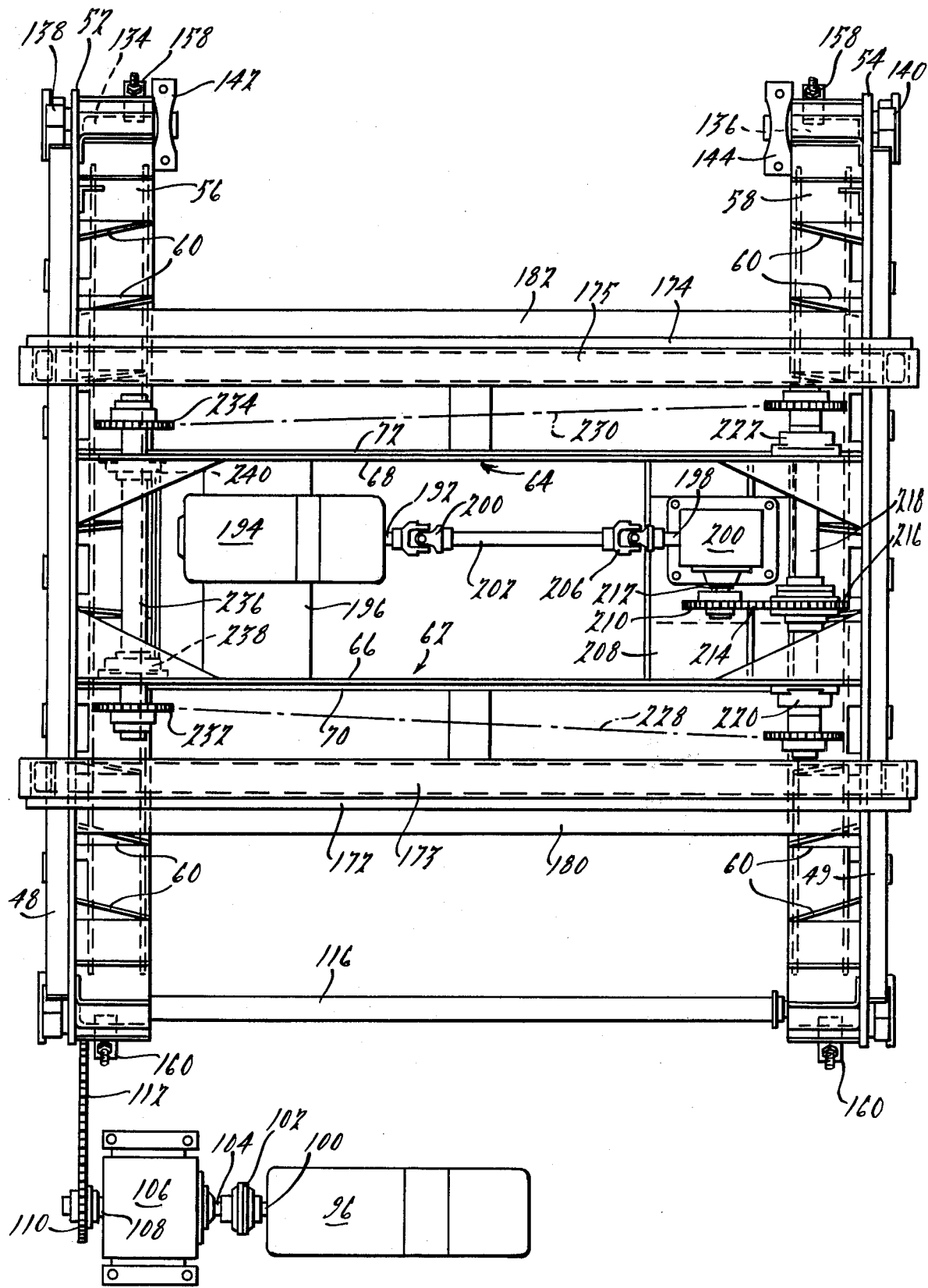

TRIP MOTION SIMULATOR

BACKGROUND OF THE INVENTION

In motion simulators of the type involved here, an action scene is projected on a screen usually located at the front of the capsule where it can be readily viewed by an audience inside the capsule, and the capsule is moved bodily to simulate the action. The audience moves with the capsule in accordance with the action being shown on the screen and accordingly experiences motion sensations that greatly enhance the realism of the scene being viewed. These simulators are used in various places and environments where people, and particularly people with children, congregate in large numbers. Amusement parks or shopping centers and malls are typical locations. In most instances, it is desirable that the capsule be indoors, and this in turn requires that the structure which supports the capsule and the drive mechanisms that actuate it be of minimum height. Mounting the capsule close to the floor assures a low center of gravity and minimizes capsule sway and vibration in use. Also, it minimizes the vertical travel distance required of the passengers as they move into and out of the capsule and consequently likelihood of injury to passengers as they negotiate the ramp or steps customarily used by them as they move to and from the capsule.

SUMMARY OF THE INVENTION

In accordance with the present invention, the pitch and roll cradles are uniquely formed and nested, each with respect to the other and with respect to a floor mounting base, to minimize the vertical distance between the capsule and the floor, and the manner in which the cradles are mounted for fore-and-aft and side-to-side rocking movement is an improvement feature of the invention. Further, the nested relationship of the cradles provides a desirable low center of gravity for the capsule. In order to achieve realism, the capsule must be actuated smoothly frequently in a compound fore-and-aft and sideway rolling movement, and its direction of movement sometimes must be quickly reversed. By nesting and interfitting the cradles in the manner described, a tendency for inertial forces generated by the relatively heavy, and sometimes top-heavy, capsule to prevent or interfere with the required movement thereof is effectively prevented or at least minimized and the stability of the entire structure is greatly enhanced. Also, the unique rockable mountings for the cradles are particularly effective in stabilizing the structure and in providing a smooth motion for the capsule at all times and particularly during rapid acceleration and deceleration of the movement and even during quick reversal of the direction of movement. In this latter connection, it is of course necessary that both the mountings for the cradles and the drives for moving them be free of lost motion when the speed is changed quickly or the direction of movement is abruptly reversed in order to avoid jerking the capsule and its audience and to achieve a smooth transition from one phase of motion to the other. Particular difficulty was experienced in developing adequately strong drive mechanisms for the cradles capable of functioning in the desired manner in the exceedingly limited vertical space afforded by the cradle mountings. The drive mechanisms herein disclosed have proved to be most effective and efficient in this regard.

STATEMENT OF THE PRIOR ART

The following patents are the most pertinent prior art of which applicant is aware.

| | | |
|---|---|---|
| 508,227 | Lake | 11/7/1893 |
| 892,070 | Murphy | 6/30/1908 |
| 1,789,680 | Gwinnett | 1/20/1931 |
| 1,803,397 | La Rizza | 5/5/1931 |
| 2,373,313 | Jeandron | 4/10/1945 |
| 3,233,508 | Hemstreet | 2/8/1966 |
| 3,873,085 | Nakamura | 3/25/1975 |
| 3,895,861 | Herndon | 7/22/1975 |
| 4,066,256 | Trumbull | 1/3/1978 |
| 1,273,969 | (French) | 9/11/1961 |

The above patents show various kinds of motion simulators including some of the same general type as the present invention that support and move a capsule which is large enough to accommodate a substantial number of persons. However, none of these patents show a motion simulator of this type having applicant's nested pitch and roll capsule-supporting cradles that provide a stable support for the capsule nor do any of these patents show a simulator embodying the particular low-profile drive of this invention that is capable of operating in a space of small vertical dimension to rockably actuate the cradles in accordance with action being portrayed in a scene projected on a screen inside the capsule as required to assure stability of the capsule in use and the safety of the people particularly during loading and unloading of the capsule.

DESCRIPTION OF THE DRAWINGS

FIG. 1 is a perspective view showing the general form and appearance of a typical motion simulator embodying the present invention;

FIG. 2 is an enlarged end elevational view of the motion simulator shown in FIG. 1, parts of the people-holding capsule and of the base being broken away to better illustrate the lower pitch and roll cradle constructions and part of the drive mechanism for the cradles;

FIG. 3 is a fragmentary, vertical sectional view taken generally on the line 3—3 of FIG. 2 and showing part of the drive for the pitch cradle;

FIG. 4 is a side elevational view of the simulator showing parts broken away for clearness of illustration;

FIG. 5 is an enlarged, fragmentary, vertical sectional view taken on the line 5—5 of FIG. 4;

FIG. 6 is an enlarged, fragmentary, vertical sectional view taken on the line 6—6 of FIG. 2;

FIG. 7 is a schematic plan view showing the drives for the pitch and roll cradles;

FIG. 8 is a view similar to FIG. 2 but illustrating the roll cradle in end elevation, part of the drive components for the roll cradle being omitted for clearness of illustration;

FIG. 9 is a fragmentary, end elevational view of the roll cradle looking generally in the direction of the arrows 9—9 in FIG. 8;

FIG. 10 is a top plan view of the roll cradle and its drive mechanism looking generally in the direction of the arrows 10—10 in FIG. 9;

FIG. 11 is a view similar to FIG. 4 but with parts of the frame removed to illustrate the pitch cradle in side elevation and showing part only of the drive components for the pitch cradle;

FIG. 12 is an end elevational view of the pitch cradle looking generally in the direction of arrows 12—12 in FIG. 11 and particularly illustrating part of the supporting structure for the roll cradle and a portion of the drive for the pitch cradle; and FIG. 13 is a top plan view of the pitch cradle looking in the direction of the arrows 13—13 in FIG. 12 and particularly illustrating portions of the drive for the pitch and roll cradles.

DESCRIPTION OF THE PREFERRED EMBODIMENT

In the drawing, wherein for the purpose of illustration is shown a preferred embodiment of the invention, the numeral 20 designates a people-holding capsule which is disposed above a suitable base structure 22. Pitch and roll cradles 50 and 51 interposed between the capsule 20 and the base 22 are nested together for accommodation in the exceedingly narrow vertical space between the capsule and the floor surface on which the base rests. The pitch cradle 50 is mounted for rocking movement on the base 22 to roll the capsule 20 in a fore-and-aft direction, and the roll cradle 51 which is attached directly to the capsule is rockably mounted on the pitch cradle to roll the capsule from side-to-side. The motion simulator of this invention has general utility and can be used wherever people congregate in substantial numbers. Amusement parks and shopping malls are typical examples of such places.

In connection with the foregoing, it will be readily appreciated that, in many places where it would be desirable to have a motion simulator of the type involved here, such as a shopping mall for example, it would not be practical to provide a pit below the capsule to accommodate the capsule supporting structure and drive mechanisms. Moreover, many and perhaps most if not all indoor places would have limited head room that would make it impractical to mount the capsule 20 very high off the floor. Moreover, the higher the capsule 20 is off the floor, the more unstable it would be in use and the greater the vertical distance passengers entering and leaving the capsule would have to move. In the situation last referred to, it would be necessary to provide a ramp or a relatively long flight of stairs that might be difficult for many people to negotiate and that possibly would pose a danger to at least some persons as they move to and from the capsule. The capsule supporting structure of this invention and the drives for rocking the capsule in its pitch and roll movements are uniquely designed and adapted to keep the vertical height of the simulator as low as possible.

It is contemplated that the capsule 20 be of any suitable size and shape; but it typically would be large enough to hold perhaps fifteen or twenty people seated in chairs or on benches suitably arranged and attached to the floor of the capsule. The particular capsule 20 here shown by way of illustration is of generally horizontally elongate, cylindrical form, it has a hemispherical nose 24 at its forward end facing the audience, and a door 26 is provided in one side thereof. Two steps 28 are here shown at one side of the base 22 for use by persons entering and leaving the capsule 20 when the door 26 is open. In this latter connection, it will be readily appreciated that the door 26 may be mounted for opening and closing movement in any suitable or conventional manner and that, when the motion simulator is in use, the door is fastened securely in its closed position.

As suggested, the passengers are seated facing the hemispherical nose 24 at the front of the capsule 20, and in use a motion picture is projected on the spherically curved inner surface of the nose or on a similarly shaped screen in the nose by a conventional motion picture projector suitably disposed at the back of the capsule or, as is more usually the case, in a compartment shown generally at 30 at the forward end of the capsule below the nose 24. Equipment for projecting an action scene on the interior screen surface of the nose 24 is well known in the art and need not be here described or shown in detail. A typical scene would be a roller coaster ride, as seen from the front seat of the lead car, or a trip through a rapids in a rubber boat, as viewed from the front end of the boat. When a scene of this type is projected on the spherically curved interior surface of the nose 24 and back along the side walls of the capsule to or past the audience, the effect on the audience becomes exceedingly realistic.

The main thrust of this invention is the provision of a suitable supporting structure and drive mechanism for the capsule 20 that not only requires minimal space beneath the capsule for reasons hereinabove set forth but which also is capable of moving the capsule bodily in fore-and-aft and in side-to-side rocking movements either separately or simultaneously as required by the particular action of the scene being viewed by the audience. For example, a river scene such as the one referred to above might show the boat approaching a large boulder in the middle of the stream that would cause the front of the boat to pitch upwardly abruptly and simultaneously lurch to one side; and, in order to give the audience the physical sensation of this movement, the capsule would be rocked forwardly and upwardly and simultaneously sideways. Then, as the boat passed by the boulder, the scene would show the front end of the boat dropping suddenly and perhaps simultaneously rolling to one side in a reverse direction. This action requires that the capsule be rolled or pitched rearwardly and simultaneously sideways in a direction opposite to that in which it was previously moved. These motions usually are of short duration but the reversal of movement frequently must be quickly executed in order that the motion experienced by the audience be realistic and timed to the sequence of events taking place in the action scene being viewed by the audience. It is essential, both from the standpoint of safety and in the interest of realism, that the mechanism for actuating the capsule be capable of moving the capsule 20 in the manner described at various rates and sometimes at rapidly accelerating or decelerating speeds and that the mechanism be capable of reversing the motion of the capsule in one or more directions without appreciable noise or vibration and, in the case of motion reversal, at least without significant jerking or lost motion. Further, for reasons stated above, it is necessary that the structure which supports the capsule for the necessary pitch and roll movements and that the mechanism for driving the capsule be accommodated in the exceedingly vertically limited space provided by the very shallow base 22.

The exact construction of the base 22 is not important to the invention of this application, it being merely necessary that the base be large enough to support the capsule 20 and to prevent the simulator from tipping or rocking in use, and that it be suitably fabricated and reinforced to provide a strong rigid structure. The base 22 here shown is made up of conventional metal structural members such as I-beams, angle members and plates suitably arranged and welded or otherwise fastened together to form a generally rectangular box-like structure that is somewhat larger in plan than the capsule 20. More particularly, it has vertically spaced, generally rectangular top and bottom plates 32 and 34 interconnected by vertical side plates 36 and 38 (FIG. 2), and end plates 39 and 40. Transverse, vertical, reinforcing plates 41 are provided internally of the base frame structure as required to assure adequate strength and rigidity. The side and end plates 36–40 are substantially as high as the steps 28 and the top plate 32 preferably extends flush with the top of the steps to provide a supporting surface directly below the opening of the door 26. As perhaps best shown in FIG. 1, the capsule 20 is generally centered directly over the base 22 and the base top plate 32 has a central opening 42 that accommodates the bottom portion of the capsule 20. As indicated previously, the capsule 20 is adapted to rock back and forth both longitudinally and transversely and the opening 42 is sufficiently large to provide adequate clearance for the capsule in all of its operational movements. Although no such means are shown, it will be readily apparent that if necessary or desirable the base 22 may have provision for anchor bolts or the like for fastening it solidly to the floor surface on which it rests so that there is no tendency for the frame to move under the pitching and rolling movements of the capsule.

In order to support the capsule 20 in use, a pair of relatively strong and rigid, vertical, supporting plates 44 and 45 are provided in the base 22 in spaced parallel relation to each other and to respective base side walls 36 and 38 (FIG. 5). In the particular construction shown, the load supporting plates 44 and 45 are welded to the bottom base plate 34 and to the side walls 36 and 38 through tubular strengthening and reinforcing members 46. Bolted or otherwise rigidly attached to the two load supporting plates 44 and 45 at the inner sides thereof and spaced equidistantly above the base bottom plate 34 are two similar horizontally inwardly extending tracks or rails 48 and 49 of elongate arcuate shape, as shown in FIG. 4. Thus, the two rails 48 and 49 extend inwardly in opposite directions at opposite sides of the base 22, and they are in opposed relation, each with respect to the other, so that they form corresponding load supports at opposite sides of the base. The pitch cradle 50 is nested between the two load supporting base plates 44 and 45 and is supported for rocking movement on the rails 48 and 49. The roll cradle 51 which carries and is fastened directly to the capsule 20 sits or is nested in the pitch cradle and is rockably supported on rails similar to the rails 48 and 49 which are mounted on the pitch cradle. As previously suggested, the pitch cradle 50 mounts the capsule 20 for fore-and-aft rocking movement on the rails 48 and 49 and the roll cradle 51 mounts it for side-to-side rocking movement.

More particularly, the pitch cradle 50 comprises vertical, laterally spaced, parallel side plates 52 and 54 having inwardly extending bottom flanges 56 and 58 suitably strengthened and reinforced by spaced gussets 60 (FIG. 5). Extending between and welded or otherwise solidly attached to the side plates 52 and 54 are spaced, parallel, transverse frame structures 62 and 64 (FIG. 13) comprising upright, load supporting plates 66 and 68 suitably strengthened and reinforced by frame members 70 and 72.

As perhaps best shown in FIG. 5, the pitch cradle 50 fits relatively snugly between the two base rails 48 and 49 but with some clearance between the rails and the cradle side plates 52 and 54. A series (here shown as 11) of rollers 74 and 76 mounted for rotation on respective side plates 52 and 54 are supported on the rails 48 and 49; and as shown in FIG. 4, the rollers in each series are spaced substantially equidistantly along their respective side plates but they extend over a considerably longer arcuate path than the rails. Thus, the rollers 74 and 76 in each series rest upon and ride along the rails 48 and 49 in all rockable positions of the pitch cradle 50 and a plurality of the rollers in each series are in engagement with the rails at all times. However, when the pitch cradle 50 is in its normal stationary position, as shown in FIG. 4, the series of rollers extend in both directions considerably beyond the rails 48 and 49. Similarly, a plurality (here shown as 5) of rollers 78 and 80 also mounted on the pitch cradle side plates 52 and 54 are arranged in an arcuate path to engage and travel along the undersurfaces of the rails 48 and 49. When the pitch cradle 50 is in the normal stationary position shown in FIG. 4, at least one of the bottom rollers 78 and 80 at each side of the cradle is positioned to engage the rail 48, 49 with which it is associated, and movement of the cradle in either direction brings one or more of the bottom rollers into position under and in engagement with the rails. Thus, the upper and lower series of rollers 74, 76 and 78, 80 trap the rails 48 and 49 therebetween and prevent the cradle from lifting off the rails. Ideally, the rollers 74, 76, 78 and 80 are of rubber or the like and are normally held under pressure against the rails 48 and 49 to hold the cradle 50 solidly but movably on the rails and to minimize noise during back and forth rocking movement of the cradle.

It is desirable that the pitch cradle 50 be capable of moving on the rails 48 and 49 a considerable distance in either direction from the neutral position shown in FIG. 4. A typical range of movement is about 20° in each direction for a total swing of approximately 40°. Rocking movement of the cradle 50 in each direction is limited by a stop 82 at the lower end of an arm 84 which is connected to and depends from a spacer 86 attached to the side plate 52 at one side of the cradle (FIGS. 5 and 11). The spacer 86 positions the arm 84 at the outer side of and spaced from the load supporting base plate 44 with the stop 82 disposed between the base side plate 36 and the plate 44. Manifestly, the fixed stop 82 moves with the pitch cradle 50 as the latter rolls on the rails 48 and 49, and it is positioned to engage fixed stops 88 and 90 (FIG. 4) mounted on one or the other of the plates 36 and 44. A series of guide rollers 92 and 94 also mounted in respective pitch cradle side plates 52 and 54 are arranged in the same arcuate pattern as the load supporting rollers 74 and are positioned between the upper and lower series of rollers 74, 76 and 78, 80 to engage and ride along the inner edges of the rails 48 and 49 to guide and to maintain proper alignment of the cradle 50 in its rocking movement.

The drive for the pitch cradle 50 comprises a motor 96 on and attached to a mounting plate 98 which is provided on the base 22 at one end of the cradle (FIGS. 2, 7 and 13). The motor drive shaft 100 is connected by a suitable coupling 102 to the driven shaft 104 of a speed reducer 106, and the drive shaft 108 of the speed reducer is connected by a sprocket 110 and an endless chain 112 to the drive sprocket 114 of a countershaft 116 extending transversely of the base 22 and rotatably supported in bearings 118 and 120 carried by the vertical, load supporting base side plates 44 and 45. Driving connections are established between the countershaft 116 and the pitch cradle 50 at both sides of the latter through a pair of drive chains 122 and 124 interengaged with respective driven sprockets 126 and 128 on and fixed to the shaft 116 adjacent opposite ends thereof. As perhaps best shown in FIGS. 7 and 11, the chains 122 and 124 extend between the lower peripheries of the driven sprockets 126 and 128 and idler sprockets 130 and 132 as shown at 146 in FIG. 11. The idler sprockets 130 and 132 are mounted on respective shafts 134 and 136 disposed at opposite sides of the base 22. The two shafts 134 and 136 are journaled at one end thereof in outboard bearings 138 and 140 mounted on the load supporting plates 44 and 45 and at the other end thereof in inboard bearings 142 and 144 on the base bottom plate 34. FIG. 3 shows the drive chain 122 in side elevation, and it will be readily appreciated that the companion drive chain 124 is similarly mounted and arranged at the opposite side of the pitch cradle 50. Each of the drive chains 122 and 124 extends upwardly around the driven and idler sprockets 126, 128 and 130, 132 with which it is associated and thence inwardly as shown at 148 and 150 in FIG. 11. The two inwardly extending portions 148 and 150 of each drive chain 122 and 124 cross each other and the terminal portions thereof wrap partially around the undersurface of the pitch cradle 50 in a channel or way 152 (FIG. 5) defined by laterally spaced depending guides 154 and 156 on the undersides of the cradle side plate flanges 56. As perhaps best shown in FIG. 5, the ways 152 are sufficiently wide so that the upper runs 148 and 150 of each drive chain 122 and 124 are spaced well apart so as not to interfere with each other in use. In each instance the upper chain runs 148 and 150 extend substantially to opposite ends of the pitch cradle ways 152 where the run 148 is attached to the cradle flange 56 by a longitudinally adjustable coupling 158 and the upper run 150 is attached to the same cradle flange by a longitudinally adjustable coupling 160.

In practice, the couplings 158 and 160 are adjusted to hold the drive chains 122 and 124 taut so that rotation of the driven sprockets 126 and 128 instantly transmits motion through the chains to the pitch cradle and so that there is no slack or lost motion in the drive chains which otherwise would jerk the cradle 50 when the direction of rotation of the driven sprockets 126 and 128 is reversed. Manifestly, since the two drive chains 122 and 124 are similarly mounted and connected to the pitch cradle 50 at opposite sides of the latter and since both of the drive chains are normally taut, rotation of the countershaft 116 drives the pitch cradle 50 through the drive chains back and forth in a rocking motion on the arcuately curved tracks 48 and 49, the rate of movement of the cradle 50 can be accelerated or decelerated as desired, and the direction of travel of the cradle on the tracks can be reversed at any point between the limits of movement defined by the fixed stops 88 and 90. The upper and lower series of rollers 74, 76 and 78, 80 grip the rails 48 and 49 solidly therebetween to assure smooth movement of the pitch cradle 50 back and forth on the rails and they also effectively prevent tipping or displacement of the cradle. The particular drive chain arrangement here shown and described, permits the pitch cradle 50 to be nested in the base 22 with the bottom of the cradle spaced only slightly above the floor surface on which the base rests and thus assists in keeping the capsule 20 and the center of gravity of the entire simulator structure essentially low. Interference between the upper runs 148 and 150 of the drive chains 122 and 124 is effectively prevented by offsetting the drive and idler sprockets 126, 128 and 130, 132 as shown in FIG. 7. In the particular form of the invention here shown by way of illustration, the idler sprockets 130 and 132 are spaced closer together than the drive sprockets 126, 128. Thus, the lower runs 146 of the drive chains 122 and 124 converge slightly in the direction of the idler sprockets 130 and 132; however, the angle of convergence is slight and the two sprockets 126, 130 and 128, 132 in each pair are spaced sufficiently far apart so that there is no tendency of the chains to ride off of or to jam against the sprockets. Also, the offset relationship of the drive and idler sprockets permits the upper runs 148 and 150 of the drive chains 122 and 124 to remain essentially parallel to each other and eliminates any tendency for the upper runs of the chains to move laterally or otherwise to interfere with each other as they slide back and forth in their respective ways 152. Thus, the particular chain drive arrangement of this invention not only permits the pitch cradle 50 to be mounted essentially low in the base 22 but it also assures essentially complete control of the cradle movement at all times and permits the movement of the cradle to be instantly coordinated with the particular action being shown on the screen inside the capsule 20.

As previously indicated, the roll cradle 51 is nested in and supported for back-and-forth, transverse, rocking movement by the pitch cradle 50. More particularly, the roll cradle 51 has a top plate 162 on which the capsule 20 is mounted and to which it is securely fastened in any suitable or conventional manner. A suitable strengthening and reinforcing framework designated 164 on and attached to the underside of the top plate 162 (FIG. 9) holds the latter rigid at all times and prevents flexure or buckling of the plate in use under the weight of the capsule 20. Spaced, parallel, load supporting plates 166 and 168 extending downwardly from the top plate 162 and its reinforcing framework 164 are suitably strengthened at the outer sides thereof by a plurality of spaced gusset plates 170, as also shown in FIG. 9. The two roll cradle plates 166 and 168 embrace upstanding, parallel, load supporting plates 172 and 174 on and carried by the pitch cradle 50 outboard of the two frame structures 62 and 64 and suitably backed-up by reinforcing frames 173 and 175 respectively.

Mounting the roll cradle 51 for rocking movement on and relative to the pitch cradle 50 is an upper series of arcuately arranged load supporting rollers 176 and 178 mounted for rotation on the depending load supporting plates 166 and 168, respectively. The rollers 176 and 178 rest upon and are supported by arcuate rails 180 and 182 on and extending radially outwardly from the pitch cradle load supporting plates 172 and 174. A lower series of rollers 184 and 186 on the plates 166 and 168, respectively, are provided at the undersides of the tracks 180 and 182. Guide rollers 188 and 190 also carried by the roll cradle load supporting plates 166 and 168 are provided opposite the free edges of the rails 180 and 182.

From the foregoing, it will be readily apparent that the roll cradle 51 is mounted on and supported by the pitch cradle 50 in essentially the same way that the pitch cradle is mounted on and supported by the base 22. The only difference is that the pitch cradle 50 is mounted for longitudinal rocking movement relative to the base 22 whereas the roll cradle 51 is mounted for transverse rocking movement relative to the base. The upper and lower series of rollers 176, 178 and 184, 186 on the roll cradle 51 hold the arcuate tracks 180 and 182 firmly but movably therebetween and the guide rollers 188, 190 riding on the free edges of the tracks hold the roll cradle straight on the pitch cradle as the roll cradle moves back and forth in its arcuate path of travel on the rails 180 and 182.

The drive for the roll cradle 51 is similar to the drive for the pitch cradle 50. More particularly, the drive shaft 192 of a motor 194 mounted on a suitable supporting platform 196 extending between and carried by the pitch cradle frame structures 62 and 64 is drivingly connected to the driven shaft 198 of a gear reducer 200 by a connecting shaft 202 and universal joints 204 and 206. As shown in FIG. 13, the gear reducer 200 is mounted on a second platform 208 also extending between and carried by the frame structures 62 and 64. A sprocket 210 on the driven shaft 212 of the gear reducer 200 is connected by an endless chain 214 to a drive sprocket 216 on a countershaft 218 which is journaled for rotation in spaced bearings 220 and 222 carried by the two load supporting plates 66 and 68 of the frame structures 62 and 64. As shown in FIGS. 7 and 13, the countershaft 218 is disposed adjacent one side of the pitch cradle 50, and the ends of the countershaft extend beyond the bearings 220 and 222. Driven sprockets 224 and 226 on the ends of the countershaft 218 outboard of the pitch cradle load supporting plates 66 and 68 are connected by drive chains 228 and 230 to idler sprockets 232 and 234 on and fixed to a shaft 236 which is journaled for rotation in bearings 238 and 240 mounted on the load supporting plates 66 and 68, respectively. The two idler sprockets 232 and 234 are mounted on the shaft 236 outboard of the load supporting plates 66 and 68 generally in-line with but offset slightly inwardly from their respective driven sprockets 224 and 226. Thus, the two drive chains 228 and 230 for the roll cradle 51 are mounted in the same way as the two drive chains 122 and 124 for the pitch cradle. More particularly, the lower runs of the chains 228 and 230 extend from and between the lower peripheries of their respective sprockets 224, 232 and 226, 234 and both chains extend upwardly around the sprockets and oppositely in downwardly facing arcuate channels or ways 242 and 244 on the undersurface of frame members 246 and 248 on and depending from the top plate reinforcing frame 164 outboard of the load supporting plates 172 and 174 and their tracks 180 and 182. As in the case of the pitch cradle 50, the chains 228 and 230 extend to opposite ends of the roll cradle 51 and are attached to the latter by longitudinally adjustable couplings 250, as shown in FIG. 9.

Manifestly, the couplings 250 can be adjusted in the same manner and for the same purpose as the chain drive for the pitch cradle 50. Similarly, two idler sprockets 232 and 234 are spaced closer together than the driven sprockets 224 and 226 so that the lower runs of the chains 228 and 230 converge slightly in the direction of the idler sprockets. This in turn permits the differences in spacing between the drive sprockets 224, 226 and the idler sprockets 232, 234 to be compensated by the slight diagonal positioning of the lower runs of the chain 228 and 230 so that the terminal portions of each chain that slide in the ways 242 and 244 remain parallel and free from interference with each other in use even though the motion of the roll cradle is reversed quickly or rapidly accelerated or decelerated at times. The amount of roll movement should, of course, be sufficient to permit the simulator to depict the action of the scene being projected on the screen within the capsule 20. Experience indicates that a roll of approximately 20° each side of center, as shown in FIG. 2, is adequate for this purpose in most cases. A stop 252 on one or both of the roll cradle side plates 166, 168 (FIG. 8) is engageable with stops 254 and 256 on the pitch cradle 50 (FIG. 2) to prevent the roll cradle 51 from exceeding the permissible limit of rolling or rocking movement.

As in the case of the pitch cradle 50, the chain drive arrangement here shown and described permits the roll cradle 51 to be nested in the pitch cradle 50 with the bottom of the roll cradle assembly disposed only slightly higher than the bottom of the pitch cradle assembly. At the same time, both drives for the pitch and roll cradles 50 and 51 work freely independently of each other so that each drive can be operated independently or both drives can be operated simultaneously without one drive affecting the other. This arrangement of course also has the additional benefit that the internesting relationship between the pitch cradle 50 and the base 22 and between the roll cradle 51 and the pitch cradle 50 keeps the center of gravity of the simulator essentially low so as to stabilize the simulator and particularly the capsule 20 in use, and it also disposes the doorway through which the people move into and out of the capsule relatively close to the floor on which the base 22 rests and minimizes the vertical distance and consequently the number of steps that must be negotiated by the people in moving into and out of the capsule.

I claim:
1. A motion simulator comprising
 a passenger-holding capsule;
 superimposed, essentially shallow, pitch and roll cradles disposed under said capsule;
 means mounting said pitch cradle for limited fore-and-aft rocking movement with respect to said capsule;
 means mounting said roll cradle in nested relation with respect to said pitch cradle and for limited transverse rocking movement with respect to said capsule; and
 reversible drive means for rockably moving said pitch and roll cradles independently of each other.

2. A motion simulator as defined in claim 1 wherein each of said drive means comprises pairs of spaced, generally horizontally aligned drive sprockets, a drive chain for and engaged with each pair of sprockets, each of said chains extending between and below its respective pair of sprockets and thence upwardly around said sprockets and oppositely in laterally spaced, crisscross relation to the cradle with which it is associated, and means connecting the ends of said chains to their respective cradles at spaced locations thereon.

3. A motion simulator comprising
 a passenger-holding capsule;
 superimposed pitch and roll cradles below said capsule;
 means fastening said capsule to said roll cradle;
 means supporting said roll cradle for transverse rocking movement on said pitch cradle;
 means supporting said pitch cradle for fore-and-aft rocking movement; and means for rockably driving said roll and pitch cradles each independently of the other comprising rotatably driven sprockets disposed transversely beneath and adjacent to opposite ends of said cradles, and drive chains extending horizontally between and around the drive sprockets for said roll cradle and said pitch cradle, each of said chains extending between and around a pair of sprockets at opposite ends of its respective cradle and extending from said sprocket oppositely and laterally in spaced crisscross relation.

4. A motion simulator as defined in claim 3 including means adjustably connecting the ends of said chains to said cradles at opposite ends of the latter.

5. A motion simulator comprising
a base;
a passenger-holding capsule;
a pitch cradle mounted for rocking movement on said base;
a roll cradle carrying said capsule and mounted on said pitch cradle for rocking movement in a direction transverse to the direction of movement of said pitch cradle;
means for rockably driving said pitch cradle and the elements supported thereby including said roll cradle and said capsule relative to said base including spaced rotatable drive support members on said base, flexible driving means extending between and around said drive support members and thence oppositely in laterally spaced, crisscross relation to said pitch cradle, connections fastening said flexible drive means at spaced points to said pitch cradle, and reversible actuator means for moving said flexible drive means back and forth on said drive support members; and
means for rockably driving said roll cradle and the capsule supported thereby relative to said pitch cradle including spaced rotatable drive support members on said pitch cradle, flexible drive means extending between and around said last mentioned support members and thence in oppositely and laterally spaced, crisscross relation to said roll cradle, connections fastening said last mentioned flexible drive means at spaced points to said roll cradle, and reversible actuator means for moving said last mentioned flexible drive means on said last mentioned drive support members.

6. A motion simulator as defined by claim 5 including means for independently limiting the extent of pitch and roll rocking movements of said cradles.

7. A motion simulator as defined by claim 5 including arcuate track members on said base and said pitch cradle, and
rollers on said pitch and roll cradles movable on said track members to support and guide said cradles during rocking movement thereof.

8. A motion simulator as defined by claim 5 wherein said drive support members are in the form of sprockets, wherein
said flexible drive means comprises chains drivingly engaged by said sprockets, and wherein
said drive means is drivingly connected to at least one of said sprockets.

9. A motion simulator as defined by claim 8 wherein said connections are adjustable to vary the degree of tautness of said chain drive means, said adjustable connections adapted to hold said chain drive means sufficiently taut so that the rocking motion of said pitch and roll cradles can be reversed without significant lost motion or play in said drive means.

* * * * *